United States Patent
Kelley (10) Patent No.: US 10,377,397 B2
(45) Date of Patent: Aug. 13, 2019

(54) DETECTION OF ANOMALIES IN RAIL WHEELSETS

(71) Applicant: OPTASENSE HOLDINGS LIMITED, Farnborough, Hampshire (GB)

(72) Inventor: John Kelley, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 123 days.

(21) Appl. No.: 15/504,376

(22) PCT Filed: Aug. 14, 2015

(86) PCT No.: PCT/GB2015/052373
§ 371 (c)(1),
(2) Date: Feb. 16, 2017

(87) PCT Pub. No.: WO2016/027072
PCT Pub. Date: Feb. 25, 2016

(65) Prior Publication Data
US 2018/0222498 A1    Aug. 9, 2018

(30) Foreign Application Priority Data

Aug. 18, 2014 (GB) .................................. 1414616.1

(51) Int. Cl.
*G01H 9/00*    (2006.01)
*B61L 1/06*    (2006.01)
*B61K 9/12*    (2006.01)

(52) U.S. Cl.
CPC .................. *B61K 9/12* (2013.01); *B61L 1/06* (2013.01); *G01H 9/004* (2013.01)

(58) Field of Classification Search
CPC .. G01H 9/004; G01N 2291/011; G01N 29/07; G01N 29/4454; B61K 9/12; B61L 1/06
See application file for complete search history.

(56) References Cited

U.S. PATENT DOCUMENTS

| 4,129,276 A | 12/1978 | Svet | |
|---|---|---|---|
| 4,702,104 A * | 10/1987 | Hallberg | B61K 9/12 246/169 R |

(Continued)

FOREIGN PATENT DOCUMENTS

| EP | 1207091 | 5/2002 |
|---|---|---|
| EP | 1839990 | 10/2007 |

(Continued)

OTHER PUBLICATIONS

Filograno et al., "Real Time Monitoring Railway Traffic Using Fiber Bragg Grating Sensors", IEEE Sensors Journal, vol. 12, No. 1, Jan. 1, 2012.

(Continued)

*Primary Examiner* — Natalie Huls
(74) *Attorney, Agent, or Firm* — McDonnell Boehnen Hulbert & Berghoff LLP (57) ABSTRACT

This application relates to methods and apparatus for the detection of anomalies in the wheelsets of rail vehicles, for instance for detection of defects such as wheel flats (303) of a wheel (301). The method using a distributed acoustic sensor (106) having a sensing optical fiber (104) deployed along at least part of a rail track (201) as a train (202) moves along that part of the track. The distributed acoustic sensor detects acoustic signals from a plurality of longitudinal sensing portions of the sensing optical fiber. A processor 108 analyzes the acoustic signals to determine the train speed v. Having determined the train speed the processor also analyzes the acoustic signals for a characteristic acoustic signal so as to detect an anomaly in a wheelset where the characteristic acoustic signal is based on the determined train speed. In particular the method may involve at least a first section of track where the train travels with a first speed v1 and a second section of track where the train travels with a second different speed v2 the characteristic acoustic signal (Continued)

may be a repetitive signal at a frequency that varies proportional to the train speed.

18 Claims, 2 Drawing Sheets

(56) References Cited

U.S. PATENT DOCUMENTS

| | | | | |
|---|---|---|---|---|
| 5,029,477 | A * | 7/1991 | Bambara | G01N 29/30 246/169 S |
| 2001/0045495 | A1 * | 11/2001 | Olson | B61L 23/044 246/121 |
| 2006/0010971 | A1 | 1/2006 | Kilian et al. | |
| 2012/0017687 | A1 * | 1/2012 | Davis | G01D 5/35383 73/655 |
| 2012/0136637 | A1 * | 5/2012 | Duan | B61K 9/12 703/2 |
| 2012/0217351 | A1 | 8/2012 | Chadwick et al. | |
| 2013/0151203 | A1 * | 6/2013 | McEwen-King | G01H 9/004 702/189 |
| 2014/0362668 | A1 * | 12/2014 | McEwen-King | G01H 9/004 367/118 |
| 2015/0000415 | A1 * | 1/2015 | Kelley | B61L 5/12 73/649 |
| 2015/0013465 | A1 * | 1/2015 | Godfrey | B61L 23/044 73/655 |
| 2016/0078760 | A1 * | 3/2016 | Crickmore | G08G 1/04 701/117 |
| 2016/0334543 | A1 * | 11/2016 | Nagrodsky | G01V 13/00 |
| 2018/0029619 | A1 * | 2/2018 | Rosenberger | B61L 1/00 |
| 2018/0267201 | A1 * | 9/2018 | Lewis | B61L 1/166 |

FOREIGN PATENT DOCUMENTS

| | | |
|---|---|---|
| EP | 2112047 | 10/2009 |
| GB | 2442745 | 4/2008 |
| WO | WO 91/11355 | 8/1991 |
| WO | WO 2012/137021 | 10/2012 |
| WO | WO 2012/137022 | 10/2012 |
| WO | WO 2013/114129 | 8/2013 |

OTHER PUBLICATIONS

Anderson, "Detecting Flat Wheels with a Fiber-Optic Sensor", Rail Conference, Proceedings of the 2006 IEEE/ASME Joint, pp. 25-30, Jan. 1, 2006.
Bollas et al., "Acoustic Emission Monitoring of Wheel Sets on Moving Trains", Construction and Building Materials 48, pp. 1266-1272, Mar. 15, 2013.

\* cited by examiner

DETECTION OF ANOMALIES IN RAIL WHEELSETS

FIELD OF THE INVENTION

This application relates to methods and apparatus for monitoring of trains moving on a rail track using fibre optic distributed sensing to detect anomalies in wheelsets, and in particular to the detection of anomalies in the rolling parts of a wheelset and especially the detection of wheel flats.

BACKGROUND OF THE INVENTION

For safety reasons there is a clear desire to detect anomalies in the wheelset of a rail vehicle. Failure of even a single wheel of a train could potentially lead to derailment with potentially drastic consequences.

One such wheel defect which it is wished to detect is a wheel flat. A wheel flat is a fault in the shape of the wheel, for example an area of the wheel which is deformed from the normal generally circular shape. A wheel flat may for instance comprise a relatively flat spot on the wheel. Wheel flats can be caused, for example, by skidding of the train wheelset along a rail. This may occur for instance under some braking conditions, for example heavy braking or if the train brakes are not applied correctly. Slippery rail or slip-and-slide conditions can also cause a train wheel to start a skid which can cause problem if the skid extends beyond the slippery section of the rail. The wheel shape can be deformed as the wheel is dragged along the rail.

A wheel developing a wheel flat can be problematic in various ways. The process of generating the wheel flat may have damaged the wheelset, for instance due to the heat generated during the wheel skid. Additionally the area with the wheel flat will tend to impact on the rail during the wheel rotation. The repeated impact on the wheel can lead to further damage of the wheel and/or possibly the associated bearing assembly. In addition the wheel flat may cause damage to rail track itself. In extreme cases this can lead to the wheel or the rail track failing catastrophically. The wheel flat may also deform the wheel altering the clearance between the wheel and the brake block which may cause problems.

There is therefore a clear desire to detect wheel flats so that preventative maintenance can be applied. The most basic method of wheel flat detection is visual inspection of the train wheels by maintenance personnel. However such a method is time consuming as each wheel must be checked individually and typically the train must be moved between two or more inspections of the wheel or perhaps moving continuously at a slow speed so that the whole perimeter of each wheel can be inspected.

Some methods of wheel flat detection rely on detecting the conditions likely to lead to a wheel flat, e.g. skidding of a train wheel. If the train or a particular wheel is determined to have skidded this may trigger an alert and prompt an appropriate inspection.

It has also been proposed to use acoustic monitoring to provide detection of wheel flats. As mentioned above, as a wheel with a wheel flat rotates the wheel flat will impact on the rail, which can produce an impact noise. As the train moves the repeated impacts from a wheel flat will therefore typically lead to a repetitive noise due to the repeated impacts. This repetitive impact noise can be used as an acoustic signature indicative of a wheel flat. It has therefore been proposed to place an acoustic transducer such as a microphone by the side of a rail track to listen to the sounds generated by a train as it passes. If an acoustic signal with a significant periodic component were to be detected this could be used as indication of a possible wheel flat.

Acoustic monitoring for wheel flat detection offers several benefits. A single trackside sensor can provide automatic monitoring of all trains that pass that sensor and doesn't require any sensing equipment on the train itself.

SUMMARY OF THE INVENTION

Embodiments of the present invention relate to detection of wheel flats and/or other related defects in the rolling components of wheelsets of rail vehicles by acoustic/vibrational detection and aim to provide improved detection/discrimination.

Thus according to the present invention there is provided a method of detecting an anomaly in a wheelset of a train comprising:

taking data acquired by a distributed acoustic sensor having a sensing optical fibre deployed along at least part of a rail track as the train moves along that part of the track, wherein the data corresponds to acoustic signals detected by a plurality of longitudinal sensing portions of said sensing optical fibre;

analysing the acoustic signals to determine the train speed; and analysing the acoustic signals from the longitudinal sensing portions for a characteristic acoustic signal so as to detect an anomaly in a wheelset;

wherein said characteristic acoustic signal is based on the determined train speed.

The method of this aspect of the present invention therefore uses the principles of fibre optic distributed acoustic sensing (DAS). Distributed acoustic sensing is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the intensity of disturbance of the fibre at that sensing portion. Thus the DAS sensor effectively acts as a linear sensing array of acoustic sensing portions of optical fibre. The length of the sensing portions of fibre is determined by the characteristics of the interrogating radiation and the processing applied to the backscatter signals but typically sensing portions of the order of a few meters to a few tens of meters or so may be used. As used in this specification the term "distributed acoustic sensing" will be taken to mean sensing by optically interrogating an optical fibre to provide a plurality of discrete acoustic sensing portions distributed longitudinally along the fibre and the term "distributed acoustic sensor" shall be interpreted accordingly. The term "acoustic" shall mean any type of pressure wave or mechanical disturbance that may result in a change of strain on an optical fibre and for the avoidance of doubt the term acoustic be taken to include ultrasonic and subsonic waves as well as seismic waves.

DAS can be operated to provide many sensing channels over a long length of fibre, for example DAS can be applied on fibre lengths of up to 40 km or more with contiguous sensing channels of the order of 10 m long. Thus a long length of railway can be monitored but with high spatial resolution sampling. For length of more that 40 km or so several DAS sensors units can be deployed at various intervals to provide continuous monitoring of any desired length of railway.

The ability to detect acoustic signals over a plurality of separate channels which can be contiguous over a long length of the railway allows signals to detected over a longer time period than with a conventional trackside sensor and also allows signals to be detected at a range of different train speeds.

Analysing the acoustic signals to determine the train speed may thus comprise identifying at least a first section of track where the train travels with a first speed and a second section of track where the train travels with a second different speed. In this case analysing the acoustic signals for a characteristic acoustic signal may comprise analysing the acoustic signals from the longitudinal sensing portions from the first section of track based on the first speed and analysing the acoustic signals from the longitudinal sensing portions from the second section of track based on the second speed to detect a repetitive signal at a frequency that varies proportional to the train speed.

In some embodiments the presence of an acoustic signal that is present at more than one speed with a frequency component that varies proportional to train speed may itself be used as indication of an anomaly.

In some embodiments the characteristic acoustic signal may comprises a repetitive signal having a characteristic frequency proportional to the determined train speed and a characteristic value.

In some embodiments the characteristic acoustic signal may comprises a first repetitive signal in the acoustic signals from the longitudinal sensing portions from the first section of track having a characteristic frequency proportional to the first train speed and a characteristic value and a second repetitive signal in the acoustic signals from the longitudinal sensing portions from the second section of track having a characteristic frequency proportional to the second train speed and the same characteristic value.

The characteristic value may correspond to a rotational parameter for a rotating component of the wheelset, the rotational parameter being related to the extent of rotation of that rotating component as the train travels a given distance. For example for detection of a wheel flat the relevant rotating component is the train wheel and the characteristic value is the inverse of the wheel diameter.

In some embodiments the method may comprise analysing the acoustic signals for a repetitive signal having a frequency that is within a range of characteristic frequencies, wherein said range of characteristic frequencies correspond to a range of values of said rotational parameter. Additionally or alternatively the method may comprise analysing the acoustic signals for a repetitive signal having a frequency that corresponds to one of a plurality of characteristic frequencies, wherein each characteristic frequency is based on a different values of the rotational parameter. At least some of said different values of rotational parameter may correspond to different possible values for one component of the wheelset. Additionally or alternatively at least some of said different values of rotational parameter could correspond to values of rotational parameters for different components of the wheelset.

For example for detecting wheel flats the rotating component is a wheel and the rotational parameter is based on a known or estimated diameter of the wheel. However the exact diameter of the wheel may not be known and so a range or set of possible wheel diameters may be used to define a range and or set of possible characteristic values for the wheels. In addition train wheels typically have a profile that means that the diameter changes across the wheel. There may therefore be a range of characteristic values for a nominal wheel diameter. In addition in some embodiments the method may look for anomalies in different components and the characteristic value for a bearing say will be different to that for a wheel.

In some embodiments analysing the acoustic signals from the longitudinal sensing portions for a characteristic acoustic signal may comprise forming at least one measurement signal from the acoustic signals detected by different contributing sensing portions in a sequence, where the sensing portions are selected such that the position of the contributing sensing portion along the fibre moves with the train. The longitudinal sensing portions may be selected in sequence based on the determined train speed.

Whilst the method may be applied to data that has previously been acquired the method also encompassed actually detecting the acoustic signals using a DAS sensor. The method may therefore comprise acquiring said data by using an interrogator unit to repeatedly interrogate the sensing optical fibre with one or more pulses of interrogating radiation, detect any interrogating radiation which is backscatter from within said fibre and processing said detected backscattered radiation to provide said data.

The sensing optical fibre may be deployed along a part of the rail track where changes in the speed of a train as it moves along the track are expected, e.g. by at least a first section of track where there is a first average speed and a second section of track where there is a second, different average speed. The fibre may for instance be located before and after a relatively sharp bend and/or near to a station.

The method may be implemented by a suitably programmed computer and in another aspect there is provided a computer program on a non-transitory storage medium comprising computer readable code for instructing a suitable computer to perform the method of any of the variants described above.

In another aspects there is provided an apparatus for detecting an anomaly in a wheelset of a train comprising:
  a distributed acoustic sensor interrogator unit for interrogating a sensing optical fibre deployed along at least part of a rail track as the train moves along that part of the track to provide data corresponding to acoustic signals detected by a plurality of longitudinal sensing portions of said sensing optical fibre; and
  a processor configured to:
  analyse the acoustic signals to determine the train speed; and
  analyse the acoustic signals from the longitudinal sensing portions for a characteristic acoustic signal so as to detect an anomaly in a wheelset;
  wherein said characteristic acoustic signal is based on the determined train speed.

The apparatus according to this aspect of the invention may be implemented with any of the variants described above.

DESCRIPTION OF THE DRAWINGS

The present invention will now be described by way of example only with respect to the accompanying drawings, of which.

DESCRIPTION OF THE INVENTION

Embodiments of the present invention use fibre optic distributed acoustic sensing (DAS), with a sensing optical fibre deployed along at least part of a rail track to provide detection of anomalies in wheelsets of trains as they move on that rail track. The use of fibre optic DAS means that a relatively long section of track can be monitored which provides the ability to monitor the acoustic signal generated by the moving train as it moves over a relatively long distance and/or for a significant period of time and also at different speeds at different sections of the track. This can improve detection of a signal component due to a defect with the rolling components of the train wheelset.

As mentioned above a defect such as a wheel flat in the wheel of a train will result in a repetitive noise being generated by the train as it moves due to the repeated impact of the wheel flat on the rail. It will be appreciated however that the noise produced by any such defect will be just one of a range of sounds generated by the train motion and, in some instances, it may be difficult to discriminate a signal component due to a defect such as a wheel flat from other sources of noise.

It is known that the frequency of the defect noise produced by a wheel flat will depend on the train speed and also on the wheel diameter. If the train speed and relevant wheel diameter are known it is therefore possible to look for an acoustic signal component at a specific frequency of interest. Even if the exact wheel diameter is not known, for example because a number of different rail vehicles with different wheel diameters operate on the track, it would be possible to look for a number of candidate frequencies or within a certain expected frequency range based on an assumption of possible wheel diameters or a range of possible wheel diameters.

Using DAS to detect the acoustic signal from the train allows the acoustic signal generated by the train as it moves to be monitored for a longer period than would be possible with a trackside microphone at a given location, effectively providing more measurements and thus improving the signal to noise ratio (SNR). The signals from the DAS sensor may also be used to determine the train speed, thus allowing specific frequencies of interest associated with defects, i.e. characteristic frequencies, to be determined without the need for some other sensor to determine train speed or the need to receive information on train speed from the train itself. Additionally the acoustic signals generated by the train at two or more different speeds of the train can be analysed. This can improve detection of any acoustic signal generated by a defect such as a wheel flat.

As mentioned the frequency of a repetitive acoustic signal generated by a defect such as a wheel flat on a moving train is proportional to train speed (and for a wheel flat inversely proportional to wheel diameter). By monitoring the acoustic signal detected by the DAS sensor at different train speeds any component due to a defect such as a wheel flat will become more apparent. In particular looking for a signal component that varies proportional to train speed may help identify signals arising from defects such as wheel flats and eliminate false alarms from other repetitive signals that may be generated by the train motion, or elsewhere in the environment, but which do not scale with train speed.

Further examples and advantages of embodiments of the invention will be described below. Embodiments of the invention will principally be described in relation to detection of wheel flats. However the principles of the invention may be applied to detection of other defects in the rolling components of the wheelsets of trains. The term rolling components is taken to mean those elements of the wheelset of train that rotate or roll when the train moves and also components in contact with the moving parts, e.g. the wheels, bearings, bearing housing, axle etc. The term wheelset shall therefore be taken to mean an assembly of a train that comprises the wheels, axle(s) and bearings or bearing assemblies of a train. The term train shall be taken to encompass any type of rail vehicle including the locomotive and any rail cars. In general the term wheel shall be taken to mean a wheel including any tire if present.

As mentioned embodiments of the present invention employs distributed acoustic sensing (DAS).

Figure 1:
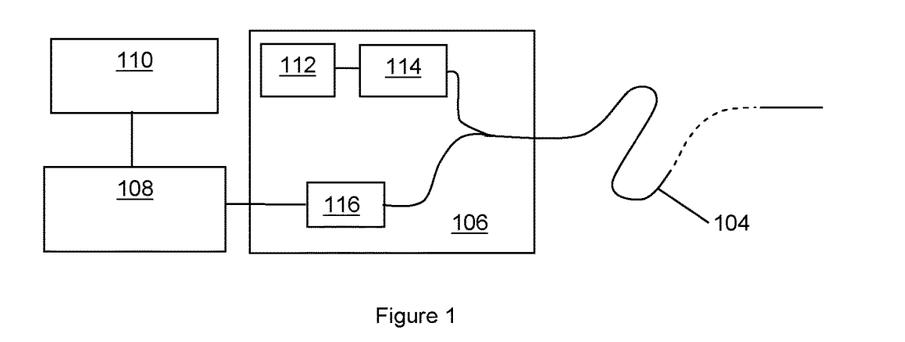
FIG. 1 illustrates a convention DAS sensor.

FIG. 1 shows a schematic of a distributed fibre optic sensing arrangement. A length of sensing optical fibre 104 is removably connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length and can be, for instance 40 km or more in length. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated to be especially sensitive to incident vibrations. The fibre will be protected by containing it with a cable structure which may contain more than one optical fibre. In use the fibre 104 is deployed in an area of interest to be monitored which, in the present invention may be along the path of a railway as will be described.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 or optical characteristics such as described in WO2012/137022, the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 and WO2012/137022 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulses separated by a known optical frequency difference. The interrogator also comprises at least one photodetector 116 arranged to detect radiation which is Rayleigh backscattered from the intrinsic scattering sites within the fibre 104. A Rayleigh backscatter DAS sensor is very useful in embodiments of the present invention but systems based on Brillouin or Raman scattering are also known and could be used in embodiments of the invention.

The signal from the photodetector is processed by signal processor 108. The signal processor conveniently demodulates the returned signal based on the frequency difference between the optical pulses. The processor may process the detected backscatter for example as described in any of GB2,442,745, WO2012/137021 or WO2012/137022. The signal processor may also apply a phase unwrap algorithm. The phase of the backscattered light from various sections of the optical fibre can therefore be monitored. Any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Note that the term acoustic shall be taken to mean any type of pressure wave or varying strain generated on the optical fibre and for the avoidance of doubt the term acoustic will be used in the specification to include seismic signals and waves or other types of vibration.

Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre of the order of 40 km say provides 4000 independent acoustic channels or so deployed along the 40 km of railway. This can provide effectively simultaneous monitoring of the entire 40 km section of track. In an application to train monitoring the individual sensing portions may each be of the order of 10 m in length or less.

As the sensing optical fibre is relatively inexpensive the sensing fibre may be deployed in a location in a permanent fashion as the costs of leaving the fibre in situ are not significant. The fibre may be deployed alongside the track and may for instance be buried alongside a section of track.

Figure 2:
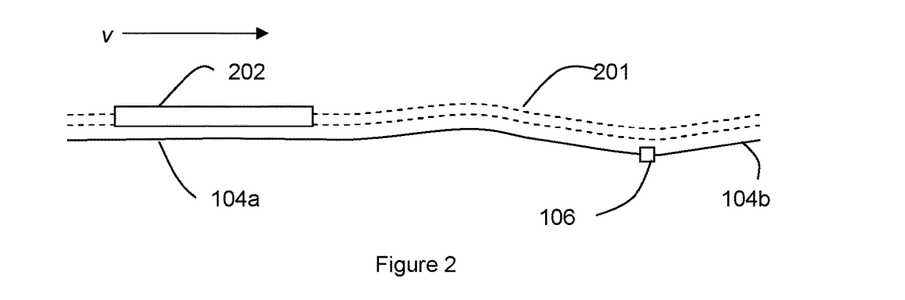
FIG. 2 illustrates a how a DAS sensor may be deployed along a railway.

FIG. 2 illustrate a section of rail track 201 with an optical fibre buried alongside the track. As mentioned above fibre optic sensing can be performed on fibre lengths of the order of 40-50 km. However for some DAS sensors it can be difficult to reliably sense beyond 50 km or so along a fibre. A length of 40-50 km may be sufficient to monitor a desired section of track, say between main stations, and other fibres could be deployed to monitor other sections of track. For very long tracks it may be necessary to chain several DAS sensors together. FIG. 2 illustrates one interrogator unit 106 arranged to monitor one optical fibre 104*a* deployed along one part of the track and another optical fibre 104*b* deployed along another length of track. The interrogator unit could house two lasers and detectors etc., i.e. dedicated components for each fibre or the laser and possibly detector could be multiplexed between the two fibres. After 40 km say of fibre 104*b* another fibre could be deployed which is monitored by another interrogator unit. Thus there could be 80 km or so between interrogator units.

In use the interrogator operates as described above to provide a series of acoustic sensing channels along the path of the track, which may be, but do not have to be, contiguous. The path of the sensing fibre is known and thus the section of rail track that an individual sensing portion of the optical fibre corresponds to will also be known. In use the acoustic signals generated by a train 202 in motion along the track 201 may be detected and analysed to detect defects such as wheel flats. The DAS sensor thus provides a monitoring system that can monitor long lengths of track with a relatively high spatial resolution. As mentioned the sensing portions may be the order of meters in length. Deploying the sensor however simply involves laying a fibre optic cable along the path of the track—and in some instance suitable fibre optics may already be in place.

As a significant length of track can be monitored by contiguous sensing portions of fibre it can relatively straightforward to detect train movement along the track. Clearly movement of the train will create a range of noises, from the engine noise of the locomotive, noises from the train cars and the couplings and noise from the wheels on the track. The acoustic signals will be greatest in the vicinity of the train and thus be looking at the intensity of the signals detected by the sensor the returns from the sensing portions of fibre adjacent the current position of the train will exhibit a relatively high acoustic intensity. The position of the train as it moves can thus be generally determined by detecting a continuous acoustic disturbance of relatively high intensity in the sensing portions of the sensing fibre.

It is therefore possible to determine the speed, v, of the train along the track by monitoring the continuous period of acoustic noise as it moves along the sensing channels of the DAS fibre.

Figure 3:
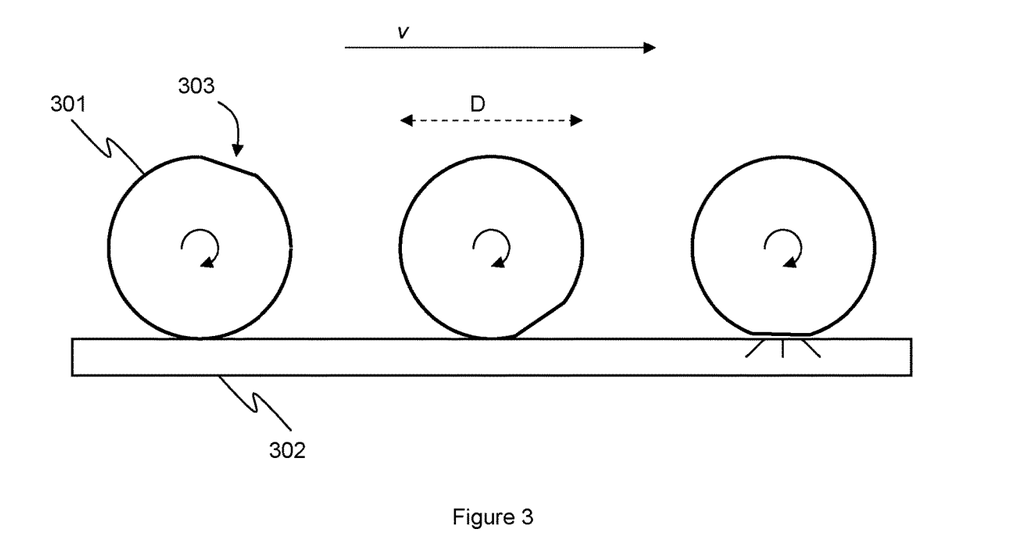
FIG. 3 illustrates how a wheel flat may produce an impact sound as the train moves.

In addition the acoustic signal generated by the train as it moves will be detected by the sensing portions of the optical fibre 104 in the vicinity of the train. In the event of a defect such as a wheel flat this acoustic signal may comprise an acoustic component related to the speed, v, of the train as illustrated with respect to FIG. 3. FIG. 3 illustrates an individual train wheel 301 rolling along a track 302 as the train moves at a substantially constant speed v. FIG. 3 illustrates that wheel, of diameter D, has a flat spot 303. The left hand side shows the wheel at a first position where the flat spot 303 is relatively distant from the rail. The position illustrated in the middle of FIG. 3 shows the wheel just before the flat spot comes into contact with the rail and the right hand side shows the flat spot impacting onto the rail and generating an increased noise due to impact.

It will be appreciated that there will thus be an impact noise generated once per revolution of the wheel. Assuming the train is moving at a constant speed v in meters per second without slipping and the wheel diameter is D meters then the frequency of the repeated impact noise will be $v/\pi \cdot D$ Hz. Thus for example a train travelling at 50 mph (about 80.5 km per hour or 22.4 ms$^{-1}$) with a nominal wheel diameter of 1 m would generate a repeated impact noise at a frequency of about 7.1 Hz.

Of course it will be appreciated that most train wheels have a tread profile such that the tread part of the wheel that is intended to contact the rail has a frustro-conical shape and thus the diameter of the part of the wheel in contact with the rail can vary. In practice therefore the impact noise would have an expected frequency range given the train speed, the nominal wheel diameter and the tread profile.

Conventionally acoustic detection of wheel flats relies on a point sensor located at one trackside location. The acoustic signal detected by such a trackside point sensor can be analysed to look for a characteristic repetitive pattern but if train speed were to be used to look for a specific frequency of interest, or a possible range of frequencies based on possible wheel diameters, then the train speed would have to be monitored separately by some other sensor and the data from the two different sensors would have to be received in one location and combined in some way. In addition the acoustic signals that can be detected are limited to those received at that one location.

Using a DAS sensor with a sensing fibre deployed along the path of the rail track, such as illustrated in FIG. 2, the acoustic signal from the train can be used to monitor the train as it moves. The acoustic signals can then be analysed to determine the train speed directly from the acoustic signals themselves without requiring any separate sensor to determine train speed. Once the train speed has been determined the acoustic signals from the longitudinal sensing portions of the sensing fibre can be analysed for a characteristic acoustic signal indicative of an anomaly in a wheelset where the characteristic acoustic signal is based on the determined train speed.

The characteristic acoustic signal may for instance comprise a repetitive signal having a characteristic frequency proportional to the determined train speed and a characteristic value. As mentioned above the repetitive acoustic signal generated by a defect in a rotating component of the wheelset of a train, or a surface in contact with such a rotating component, will be proportional to train speed. The constant of proportionality will have a characteristic value related to a rotation parameter of the rotating component, e.g. the distance that the train must travel for one complete rotation of the component (or alternatively the amount of rotation when the train travels a set distance). For a wheel flat for example the characteristic value will be related to the wheel diameter D and will be the inverse of the wheel circumference.

Knowledge of the train speed may therefore be used to determine one or more frequencies of interest or characteristic frequencies for detecting wheel flats or other defects in the rolling components of the train wheelset. If the nominal diameter of the wheels for the train in question is known then a characteristic frequency or range of characteristic frequencies may be determined based on the train speed and wheel diameter as described above. If the wheel diameter is not known exactly then a number of different possible characteristic frequencies may be determined based on possible wheel diameters, for instance with reference to a database of possible wheel sizes.

The acoustic signal can then be analysed to look for a repetitive component at the characteristic frequency or frequencies. For instance the detected acoustic signal may be filtered by one or more bandpass filters and/or the acoustic intensity in different frequency bands may be determined. Detection of such a signal may be indicative of a wheel flat. Additionally or alternative any significant frequency components in the acoustic signal may be determined and the frequency values divided by the determined train speed to provide a speed invariant value—this speed invariant value could be compared to one or more or a range of characteristic values.

The processor may be connected to a memory which stores a database of possible characteristic values for the various components of interest, e.g. characteristic values based on possible wheel diameters, bearing diameters etc.

The use of DAS also allows the acoustic signal generated by the train to be determined over a longer period of time than a conventional fixed location trackside sensor. As mentioned the sensing fibre may be many kilometers in length and thus the acoustic signal can be continuously monitored as the train travels over several kilometers. This provides a much greater amount of data to process in order to detect a characteristic acoustic signal indicative of a wheel flat or other anomaly.

In some embodiments at least one measurement signal may be generated based on the acoustic signals detected by different contributing sensing portions in a sequence, where the sensing portions are selected such that the position of the contributing sensing portion along the fibre moves with the train. For instance the sensing portions could be selected in sequence based on the train speed. This effectively provides a measurement signal from a virtual sensing portion that travels along the path of the track at substantially the same speed as the train and thus stays in substantially fixed relation to the train. In this way the measurement signal is effectively received at a virtual sensing location that tracks with the train.

Figure 4:
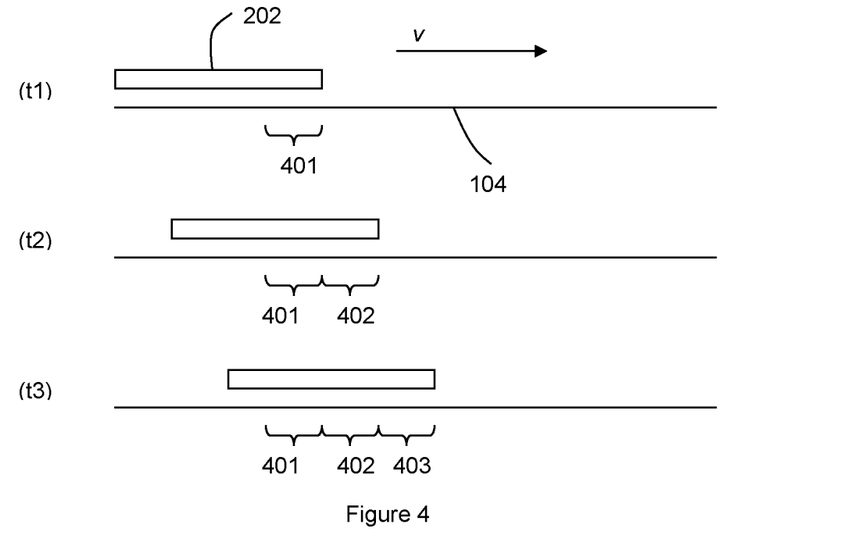
FIG. 4 illustrates how a virtual sensing portion of the acoustic fibre may move with a train.

FIG. 4 illustrates how the signals from different contributing sensing portions may be combined to form a measurement signal that tracks along with a train. FIG. 4 illustrates a train 202 moving at a speed v along a track (not illustrated). A sensing fibre 104 alongside the track is divided into a plurality of sensing portions 401-403. At a first instant (t1) a first sensing portion 401 may be selected as the contributing sensing portion. A second sensing portion 402, further along the track in the direction of train motion may be selected as the contributing sensing portion at a second later instant (t2). A third sensing portion 403 may be selected at a third instant (t3) and so on. The first, second and third sensing portions are selected such that position of the train relative to the first sensing portion at the first instant is largely or substantially the same as position of the train relative to the second sensing portion at the second instant or the third sensing portion at the third instant. In the example illustrated in FIG. 4 for example the sensing portion selected is located at the front of the train. The measurement signal is thus formed from the acoustic signals detected by sensing portion 401 from a time t1 to t2, followed by the acoustic signals detected by sensing portion 402 from a time t2 to t3 and so on.

For example consider that the train 202 is moving at 20 $ms^{-1}$ and that the sensing portions 401-403 are contiguous and 10 m in length and the fibre 104 runs along the same path as the rail track, i.e. 100 m of fibre corresponds to 100 m of track. A measurement signal may be generated using the acoustic returns from a first sensing portion from t1 till t2 where t2 is t1+0.5 s. In other words t2 is half a second later than t1, which corresponds to the time taken for the train to traverse the length of the first sensing portion 401. The signals from sensing portion 402 are then selected until a time t3 which is t2+0.5 s and so on. In this way the resulting measurement signal represents an acoustic signal from a virtual sensing portion that tracks with a given section of the train, in this example the front of the train. It will of course be appreciated that a second measurement signal may be formed from the signals from the adjacent sensing portion upstream of sensing portion of 401 in the period t1 to t2, from sensing portion 401 in the period t2 to t3 and from sensing portion from time t3 and so on. The first measurement signal would track with the front 10 m of the train and the second measurement signal would track will the next 10 m of the train. In this way a measurement signal could be generated from a virtual sensing portion that tracks with any desired section of the train.

This can aid in detecting the characteristic impact sound from individual wheelsets and can allow the location of the defective wheelset along the length of the train to be determined. For example if one particular wheel has a defect then the defect noise produced would be most pronounced in a measurement signal from a virtual sensing portion that effectively tracks with the relevant part of the train that can the defect.

This can also make acoustic detection of defects associated with other rolling components of the wheelset feasible, for instance defects in bearings or the like. It would be very difficult to detect such defects using a single trackside sensor. However as the measurement signals can be produced from virtual sensing portions that effectively move with the train for significant periods of time the signals from such defects can be detected.

In some embodiments of the invention the acoustic signal generated from the train at different speeds is monitored to aid in identifying a signal due to a wheel flat or similar defect. As mentioned above any impact noise generated by the wheel flat will be proportional to train speed and knowing the train speed means that specific frequencies of interest can be detected. In some instances however there may be other sounds that may be generated at or around the frequencies of interest which are not related to a wheel defect. This could potentially lead to a false alarm. By looking at the acoustic signals detected at different train speeds the presence of a wheel flat or related defect may be apparent as a defect noise will change in a characteristic way with train speed that other noise sources may be unlikely to replicate.

The processor may therefore be arranged to analyse acoustic signals detected when the train is travelling at a first speed and also acoustic signals detected when the train is travelling at a second, different speed. This may involve analysing the acoustic signals to determine the train speed comprises identifying at least a first section of track where the train travels with a first speed and a second section of track where the train travels with a second different speed. The processor may be configured to process the detected acoustic signals to look for acoustic signals that vary with train speed in a characteristic way.

For example the processor may analyse the acoustic signals from the longitudinal sensing portions from the first section of track based on the first speed and analysing the acoustic signals from the longitudinal sensing portions from the second section of track based on the second speed to detect a repetitive signal at a frequency that varies proportional to the train speed. The processor may analyse the detected acoustic signals for a characteristic acoustic signal comprises a first repetitive signal in the acoustic signals from the longitudinal sensing portions from the first section of track having a characteristic frequency proportional to the first train speed and a characteristic value and a second repetitive signal in the acoustic signals from the longitudinal sensing portions from the second section of track having a characteristic frequency proportional to the second train speed and the same characteristic value.

For example the processor may look for any relatively strong component at frequency f1 in the signals detected at a first train speed v1 and a frequency f2 in the signals detected at a second train speed v2 where f1/v1=f2/v2. The constant of proportionality k where k=f1/v1=f2/v2, could be determined as a characteristic value and used to try to classify the type of noise. For example for a wheel flat the characteristic value would be a rotational parameter and would be expected to be $1/\pi \cdot D$ for a wheel diameter D. For a wheel diameter of 1 m the characteristic value of the rotational parameter would thus be about $0.32$ $m^{-1}$. This can help classify the signals detected and allow identification of any signals indicative of possible defects. It will be appreciated that there may be other repetitive signals that may be generated by a train that are proportional to train speed but these may have different associated speed invariant values. For example a different sound may be generated as the wheels pass over the joints between rail sections compared to when the wheel is running in the midsection of the rail. This could lead each wheel to generate a repetitive sound as it crosses the joint between rail sections and this sound will vary with train speed. However for rail sections of the order of 20 m in length the relevant constant of proportionality k would be 0.05 $m^{-1}$ (i.e. ½0), which is much lower than that associated with a wheel flat.

The processor may thus detect any strong signal component at a particular frequency, scale the frequency value based on the train speed (to produce a speed invariant value) and compare the results obtained at a plurality of train speeds to determine the presence of a component that has a frequency proportional to train speed. Based on the determined characteristic value the sound may be classified as indicative of a defect or not. Alternatively however the train speed could be used together with one or more characteristic values to derive a set of characteristics frequencies for each determined train speed. Detection of a characteristic frequency corresponding to the same characteristic value in the signals obtained at different speeds can be taken as an indication of a defect.

For instance when looking for signals indicative of wheel flats the processor may analyse the acoustic signals corresponding to a first train speed to look for at least one first characteristic frequency or within a first characteristic frequency range based on the first train speed and a known wheel diameter or set of possible wheel diameters. The acoustic signals corresponding to the second train speed may also be analysed to look at least one second characteristic frequency or within a second characteristic frequency range based on the second train speed and the same wheel diameter. If a signal component is detected at a first characteristic frequency at the first train speed and also at a second characteristic frequency at the second train speed and the first and second characteristic frequencies correspond, i.e. could feasible be generated by the same wheel diameter, this may be a good indication of the existence of a defect such as a wheel flat. The processing may additionally or alternatively look for other characteristic frequencies indicative of other faults based on the train speed and diameters of other components, e.g. bearing sizes etc.

The processor may therefore be arranged to analyse the acoustic signals detected as a train travels at different speeds. The processor may therefore analyse the acoustic signals to determine a first set of signals corresponding to a first train speed and at least a second set of signals corresponding to second train speed. The processor may identify distinct periods where the train is travelling at a substantially constant speed during said period and with significantly different speeds in each period. Additionally or alternatively a continuous set of acoustic signals detected over time as the train changes speed may be processed. The processor may be adapted to use any signals of opportunity, i.e. to detect any instance where the train speed varies. Some slight variation in train speed may occur along any given section of track and the processor may look for such variations.

Figure 5:
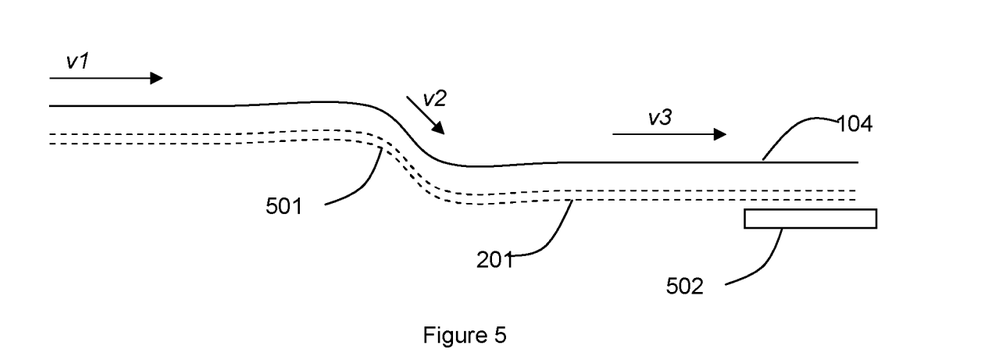
FIG. 5 illustrates a DAS sensor deployed in an area where changes in train speed are expected train.

In some embodiments however a DAS sensor used for detection of defects in wheelsets of trains may therefore be arranged with at least part of the sensing fibre deployed along a section of track where it is known that changes in train speed will occur or are likely to occur. For example as illustrated in FIG. 5 the sensing fibre 104 may be deployed before and after a relatively sharp bend 501 in track 201 where a train may be expected to reduce from a first speed v1 in the straight section to a lower speed v2 for the bend—possibly speeding up again afterwards. Additionally or alternatively the sensing fibre may be deployed near a station 502 where trains will be expected to slow down, e.g. to a relatively slow speed v3 approaching the station. It will of course be appreciated that FIG. 5 illustrates the possible speed changes of a train heading in one direction on the track. Trains heading in the opposite direction on the same section of track may undergo the generally opposite set of speed changes.

In such an arrangement the processor may be arranged to process the signals from sensing portions of fibre along the first section of track to determine a subset of signals corresponding to a first speed and also process the signals from sensing portions of fibre along the second section of track to determine a subset of signals corresponding to a second speed. The signals from the first and second subsets may then be analysed as discussed above.

Embodiments of the present invention thus provide a sensor arrangement for automatic detection of defects in the wheelsets of trains that is relatively low cost and which can be deployed relatively easily and which can provide more reliable detection and discrimination of such faults compared to other acoustic monitoring methods.

The DAS sensors used for such monitoring can also be used for a variety of other monitoring applications for the rail network, for instance general condition monitoring of the rail track. For instance any landslides or the like may be detected by the DAS sensor. Passage of trains along sections of the track or passing through or by rail network infrastructure, e.g. bridges, tunnels or the like, can produce a characteristic acoustic signature that can be detected by the DAS sensor. Any change in this characteristic over time may indicate a possible fault. The DAS sensor may also be used for monitoring or controlling the movement of trains on the rail network which may be used as part of an active train control system for instance for moving block signalling or the like and/or control of level crossings etc. or for providing passenger information e.g. at station information boards or on websites etc.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of detecting an anomaly in a wheelset of a train comprising:
    taking data acquired by a distributed acoustic sensor having a sensing optical fibre deployed along at least part of a rail track as the train moves along that part of the track, wherein the data corresponds to acoustic signals detected by a plurality of longitudinal sensing portions of said sensing optical fibre;
    analysing the acoustic signals to determine the train speed comprising identifying at least a first section of track where the train travels with a first speed and a second section of track where the train travels with a second different speed; and
    analysing the acoustic signals from the longitudinal sensing portions for a characteristic acoustic signal so as to detect an anomaly in a wheelset comprising analysing the acoustic signals from the longitudinal sensing portions from the first section of track based on the first speed and analysing the acoustic signals from the longitudinal sensing portions from the second section of track based on the second speed to detect a repetitive signal at a frequency that varies proportional to the train speed;
    wherein said characteristic acoustic signal is based on the determined train.

2. A method as claimed in claim 1 wherein said characteristic acoustic signal comprises a repetitive signal having a characteristic frequency proportional to the determined train speed and a characteristic value.

3. A method as claimed in claim 1 wherein said characteristic acoustic signal comprises a first repetitive signal in the acoustic signals from the longitudinal sensing portions from the first section of track having a characteristic frequency proportional to the first train speed and a characteristic value and a second repetitive signal in the acoustic signals from the longitudinal sensing portions from the second section of track having a characteristic frequency proportional to the second train speed and the same characteristic value.

4. A method as claimed in claim 2 wherein the characteristic value corresponds to a rotational parameter for a rotating component of the wheelset, the rotational parameter is related to the extent of rotation of that rotating component as the train travels a given distance.

5. A method as claimed in claim 4 wherein analysing the acoustic signals for a characteristic acoustic signal comprises analysing the acoustic signals for a repetitive signal having a frequency that is within a range of characteristic frequencies, wherein said range of characteristic frequencies correspond to a range of values of said rotational parameter.

6. A method as claimed in claim 4 wherein analysing the acoustic signals for a characteristic acoustic signal comprises analysing the acoustic signals for a repetitive signal having a frequency that corresponds to one of a plurality of characteristic frequencies, wherein each characteristic frequency is based on a different values of the rotational parameter.

7. A method as claimed in claim 6 wherein at least some of said different values of rotational parameter correspond to different possible values for one component of the wheelset.

8. A method as claimed in claim 6 wherein at least some of said different values of rotational parameter correspond to values of rotational parameters for different components of the wheelset.

9. A method as claimed in claim 4 wherein the rotating component is a wheel and the rotational parameter is based on a known or estimated diameter of the wheel.

10. A method as claimed in claim 1 wherein analysing the acoustic signals from the longitudinal sensing portions for a characteristic acoustic signal comprises forming at least one measurement signal from the acoustic signals detected by different contributing sensing portions in a sequence, where the sensing portions are selected such that the position of the contributing sensing portion along the fibre moves with the train.

11. A method as claimed in claim 10 wherein the longitudinal sensing portions are selected in sequence based on the determined train speed.

12. A method as claimed in claim 1 comprising acquiring said data by using an interrogator unit to repeatedly interrogate the sensing optical fibre with one or more pulses of interrogating radiation, detect any interrogating radiation which is backscatter from within said fibre and processing said detected backscattered radiation to provide said data.

13. A method as claimed in claim 12 wherein said sensing optical fibre is deployed along a part of the rail track where changes in the speed of a train as it moves along the track are expected.

14. A computer program on a non-transitory storage medium comprising computer readable code for instructing a suitable computer to perform the method of claim 1.

15. An apparatus for detecting an anomaly in a wheelset of a train comprising:
  a distributed acoustic sensor interrogator unit for interrogating a sensing optical fibre deployed along at least part of a rail track as the train moves along that part of the track to provide data corresponding to acoustic signals detected by a plurality of longitudinal sensing portions of said sensing optical fibre; and
  a processor configured to:
  analyse the acoustic signals to determine the train speed comprising identifying at least a first section of track where the train travels with a first speed and a second section of track where the train travels with a second different speed; and
  analyse the acoustic signals from the longitudinal sensing portions for a characteristic acoustic signal so as to detect an anomaly in a wheelset comprising analysing the acoustic signals from the longitudinal sensing portions from the first section of track based on the first speed and analysing the acoustic signals from the longitudinal sensing portions from the second section of track based on the second speed to detect a repetitive signal at a frequency that varies proportional to the train speed; wherein said characteristic acoustic signal is based on the determined train speed.

16. An apparatus as claimed in claim 15 wherein said characteristic acoustic signal comprises a first repetitive signal in the acoustic signals from the longitudinal sensing portions from the first section of track having a characteristic frequency proportional to the first train speed and a characteristic value and a second repetitive signal in the acoustic signals from the longitudinal sensing portions from the second section of track having a characteristic frequency proportional to the second train speed and the same characteristic value.

17. An apparatus as claimed in claim 16 wherein the characteristic value corresponds to a rotational parameter for a rotating component of the wheelset, the rotational parameter being related to the distance that the train must travel for one rotation of that rotating component.

18. An apparatus as claimed in claim 15 wherein said sensing optical fibre is deployed along a part of the rail track where changes in the speed of a train as it moves along the track are expected.

* * * * *